United States Patent
Wong et al.

(10) Patent No.: US 11,308,198 B1
(45) Date of Patent: Apr. 19, 2022

(54) BLOCKCHAIN-BASED CREDENTIAL VAULT SYSTEM (CVS)

(71) Applicant: Lucas GC Limited, Hong Kong (HK)

(72) Inventors: Wang-Chan Wong, Irvine, CA (US); Howard Lee, Porter Ranch, CA (US)

(73) Assignee: Lucas GC Limited, Hong Kong (HK)

( * ) Notice: Subject to any disclaimer, the term of this patent is extended or adjusted under 35 U.S.C. 154(b) by 0 days.

(21) Appl. No.: 17/130,136

(22) Filed: Dec. 22, 2020

(51) Int. Cl.
  G06F 21/45 (2013.01)
  H04L 29/06 (2006.01)
  G06F 16/23 (2019.01)
  G06F 40/40 (2020.01)
  G06N 3/08 (2006.01)
  H04L 51/42 (2022.01)

(52) U.S. Cl.
  CPC .......... *G06F 21/45* (2013.01); *G06F 16/2315* (2019.01); *G06F 40/40* (2020.01); *G06N 3/08* (2013.01); *H04L 63/08* (2013.01); *H04L 51/22* (2013.01)

(58) Field of Classification Search
  CPC ...... G06F 21/45; G06F 40/40; G06F 16/2315; G06N 3/08; H04L 63/08; H04L 51/22
  See application file for complete search history.

(56) References Cited

U.S. PATENT DOCUMENTS

| | | | |
|---|---|---|---|
| 2018/0041487 A1* | 2/2018 | Wang | H04L 63/20 |
| 2019/0149550 A1* | 5/2019 | Brakeville | G06F 21/62 726/5 |
| 2019/0236598 A1* | 8/2019 | Padmanabhan | G06N 3/08 |
| 2020/0153606 A1* | 5/2020 | Li | H04L 9/30 |
| 2020/0257778 A1* | 8/2020 | Pham | H04L 63/0884 |

* cited by examiner

*Primary Examiner* — Khoi V Le
(74) *Attorney, Agent, or Firm* — Helen Mao; Imperium Patent Works

(57) ABSTRACT

Methods and systems are provided for blockchain-based credential vault system (CVS). In one novel aspect, the CVS identifies a set of credential of a trustor, verifies each credential, and stores the verified credentials to a CVS blockchain database such that the authorized beneficiary can obtain the trustor credentials from the CVS. In one embodiment, the CVS authenticates a trustor request from a trustor, wherein a trustor record in the CVS is uniquely identified by a trustor identification in a blockchain-based database of the CVS, processes submission from the authenticated trustor to generate a set of canonical credentials using a recurrent neural network (RNN) model, performs credential verification for each generated canonical credential in the authenticated trustor submission, and appends each verified canonical credential to the trustor record in the blockchain-based database of the CVS.

19 Claims, 7 Drawing Sheets

BLOCKCHAIN-BASED CREDENTIAL VAULT SYSTEM (CVS)

TECHNICAL FIELD

The present invention relates generally to credential verification system and, more particularly, a blockchain-based credential vault system.

BACKGROUND

Credential verification is an important process of the hiring process. There is excessive reliance on credentials, such as academic degrees, in determining hiring or promotion policies. There is a looming credential crisis in our society. To understand what the crisis is, we must understand what credentialism and professionalization are. Credentialism is a reliance on formal qualifications or certifications to determine whether someone is permitted to undertake a task, speak as an expert or work in a certain field. Professionalization is the social process by which any trade or occupation is transformed into a true "profession of the highest integrity and competence." This process tends to involve establishing acceptable qualifications, a professional body or association to oversee the conduct of members of the profession and some degree of demarcation of the qualified from unqualified amateurs. This creates "a hierarchical divide between the knowledge-authorities in the professions and a deferential citizenry." This demarcation is often termed "occupational closure", as it means that the profession then becomes closed to entry from outsiders, amateurs and the unqualified: a stratified occupation "defined by professional demarcation and grade.

Credential inflation (aka academic inflation, degree inflation, and credential creep) is the process of inflation of the minimum credentials required for a given job and the simultaneous devaluation of the value of diplomas and degrees. Many jobs traditionally do not require college education are now filled by college graduates. There are two driving forces on credential inflation. Firstly, it is for upskilling, for example, when the nature of a job changes that requires more education. Secondly, credential inflation happens because of the mismatch in the supply of and the demand for educated workers. The New York Federal Reserve Bank estimates that 34 percent of all college graduates are underemployed, meaning they are overqualified (in terms of educational credentials) for their current job. With so many graduates floating around, employers use a degree as a screening device even if the job in question doesn't require knowledge that one might learn in college. There has been a heightened criticism of education as insufficiently relevant to jobs.

A direct consequence of credential inflation is the rise of professionalization. The conventional secondary and higher educational sequence has been challenged by a resurgence of commercial trade schools, business-operated training programs, and the crowding of professional. Furthermore, many professional certifications are created by laws and they are not offered in regular college curricula. The horizon of professionalization expands from physicians (MD, Board of Specialization), engineers (IEEE, CPE), to vendor or industry specific qualification such as accountant (CPA, CA), attorney (bar certified), Certified Information Systems Security Professional (CISSP), Project Management Professional (PMI), Microsoft Azure Solutions Architect Expert, Oracle Certified Professional, and many more. The last two are examples of vendor-specific and product-specific certification. While a college degree and diploma are permanent, many certifications have expiry; the certificate holder needs to be recertified either by exam, or by continuing education or by both.

Credentialism and professionalization are the two gate keepers whom employers rely on to hire the right people. Consequently, people react to the ever-increasing requirements on credential and professional certification by inflating them, hence credential inflation and certification inflation. Resume inflation is a generalization of these two types of inflation. It includes false or misleading information on one's resume to make oneself a more attractive candidate for a job. Examples include adding degrees, certificates, awards one never received, or employments and positions one never held.

The best practice is for a company to do their homework prior to making a new hire. This type of due diligence does not start with the interview process; on the contrary, the best method to finding the right employee is to do your research before you grant him or her an initial interview.

Improvements and enhancements are required to provide a reliable credential verification system.

SUMMARY

Methods and systems are provided for blockchain-based credential vault system (CVS). In one novel aspect, the CVS identifies a set of credentials of a trustor, verifies each credential, and stores the verified credentials to a CVS blockchain database such that the authorized beneficiary can obtain the trustor credentials from the CVS. In one embodiment, the CVS authenticates a trustor request from a trustor, wherein a trustor record in the CVS is uniquely identified by a trustor identification in a blockchain-based database of the CVS, processes submission from the authenticated trustor to generate a set of canonical credentials using a recurrent neural network (RNN) model, performs credential verification for each generated canonical credential in the authenticated trustor submission, and appends each verified canonical credential to the trustor record in the blockchain-based database of the CVS. In one embodiment, the trustor ID is at least one selecting from an official government-issued ID card, a self-introduction video clip. In another embodiment, authenticating is performed by image processing a selfie of the trustor alongside an official photo ID submitted by the trustor via a CVS registered device. In one embodiment, the canonical credential is an official-record-based credential that is verifiable by a certified official record. In another embodiment, the verification is performed based on an official record corresponding to the canonical credential in the submission. In yet another embodiment, there is no corresponding official record for the canonical credential in the submission, and wherein an authorization reference is generated for the canonical credential. In one embodiment, the authorization reference is an instruction returned to the trustor that includes direct links for obtaining corresponding official record for the canonical credential. In another embodiment, the authorization reference triggers a robotic verification of the CVS. In one embodiment, the robotic verification by the CVS uses at least one inquiry process comprising an automated email correspondence and a chatbot voice inquiry. In another embodiment, robotic verification further comprising an RNN process performing a natural language process/natural language understanding (NLP/NLU) on one or more responses to the inquiry process. In one embodiment, the blockchain-based database comprises a credential vault blockchain and a private interplanetary file system (IPFS). In another embodiment, an asset related to a canonical credential is stored in the private IPFS and an asset ID of the asset is appended to the credential vault blockchain.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

The due diligence is a grinding and painful long process that must go over for each new hiring, more so for higher up positions. Ideally, the person who has acquired the credentials should be in-charge of his own credentials. However, most of time, the applicants have to rely on third parties, such as universities or employers, to retain, verify and validate their credentials. Job seekers have to request official transcripts from university registrars and pay fees for each copy of the transcript requested. Employers and universities, still at times, need to call the issuing authority of the certificate if they want to verify the transcripts. It is complicated and tedious, which is one of the major factors for frauds. Making certificates easily verifiable and transferable is one advantage of digital systems. To a job seeker, providing the authenticity of items listed on his resume for a job application can help expedite the due diligence process of hiring process, hence, a better chance for an interview. The credential vault system is advantageous by offering a transparent, immutable, and secured repository to the applicant/trustor and the beneficiary/requestor for verified credentials from the issuer.

Figure 1:
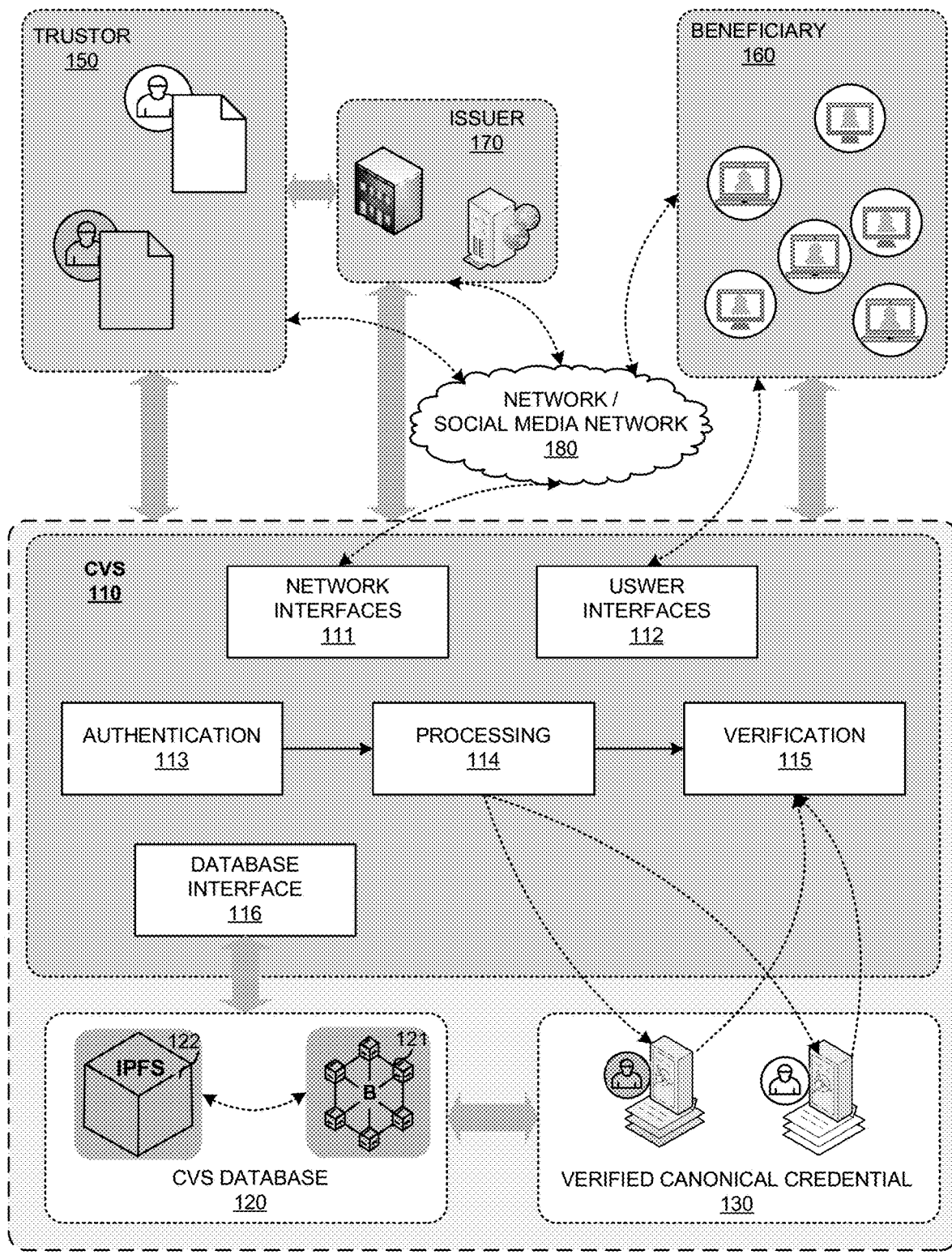
FIG. 1 illustrates exemplary diagrams for a blockchain-based credential verification system (CVS) with interfaces to the trustors, the beneficiaries, and the issuers in accordance with embodiments of the current invention.

FIG. 1 illustrates exemplary diagrams for a blockchain-based credential verification system (CVS) with interfaces to the trustors, the beneficiaries, and the issuers in accordance with embodiments of the current invention. A CVS 110 includes one or more network interfaces 111, one or more user interfaces 112, an authentication module 113, a processing module 114, a verification module 115, and a database interface 116. A CVS database 120, which includes a CVS blockchain 121 and an Interplanetary File System (IPFS) 122, interacts with CVS 110. A set of verified canonical credentials for corresponding trustors 130 are stored in CVS data 120. CVS 110 interacts with a trustor 150, a beneficiary 160, an issuer 170, and a network/social media network 180.

Trustor 150 includes a group of trustors who create an account and corresponding trustor record in CVS 110. Trustor 150 interacts with CVS 110 through user interface and/or through network connections. Each trustor in trustor 150 has a trustor identification (ID) associates with the corresponding trustor record. The trustor submits the description of the credentials to CVS 110. The credential descriptions take different formats including a resume, plain text files, images, and CVS-formatted canonical credential descriptions. CVS 110 processes the submitted credential descriptions from the trustor and generates corresponding canonical credentials for verifications. Trustor 150 also interacts with issuer 170 to obtain corroborations for corresponding credentials, such as certifications and diplomas. These corroborations are submitted to CVS 110.

Beneficiary 160 includes a group of beneficiaries that interacts with CVS 110 through a user interface and/or network connections. A beneficiary submits request to access one or more authorized trustor records and/or to verify one or more credentials of one or more trustors. In one embodiment, the beneficiary submits a job description to CVS 110. CVS 110 processes the job description and generates a set of canonical credentials required based on the job description. In one embodiment, CVS 110 uses a deep learning-based process to generate the set of canonical credentials based on the job description. The beneficiary does not contact issuer 170 and can obtain verification of candidate's credential instantly through CVS.

In one novel aspect, a blockchain-based credential vault system verifies identities, credentials, and job history and experience of a trustor. Once verified, the information is stored in a blockchain as a single source of truth. The blockchain-based CVS allows the trustor to release identity, credentials and job history and experiences (JHE) to authorized beneficiaries for the whole credential record or a subset of the verified credentials. In one embodiment, the CVS 110 includes one or more network interfaces 111, an authentication module 113, a processing module 114, a verification module 115, and a database interface 116. The one or more network interfaces 111 connects the system with a social media network. The authentication module 113 authenticates a trustor request from a trustor, wherein a trustor record in the CVS is uniquely identified by a trustor identification in a blockchain-based database of the system. The processing module 114 processes a submission from the authenticated trustor to generate a set of canonical credentials using a recurrent neural network (RNN) model. The verification module 115 performs credential verification for each generated canonical credential in the authenticated trustor submission. The database interface 116 that appends each verified canonical credential to the trustor record in the blockchain-based database of the CVS.

In one embodiment, CVS database 120 and verified canonical credential 130 are integral parts of the CVS 110. In another embodiment, CVS database and verified canonical credential 130 run on a different platform. In other embodiments, the CVS modules and components run one or more processors or run on different network-connected devices and communicate with each other via predefined network messages. In other embodiments, the functions can be implemented in software, firmware, hardware, or any combinations.

Figure 2:
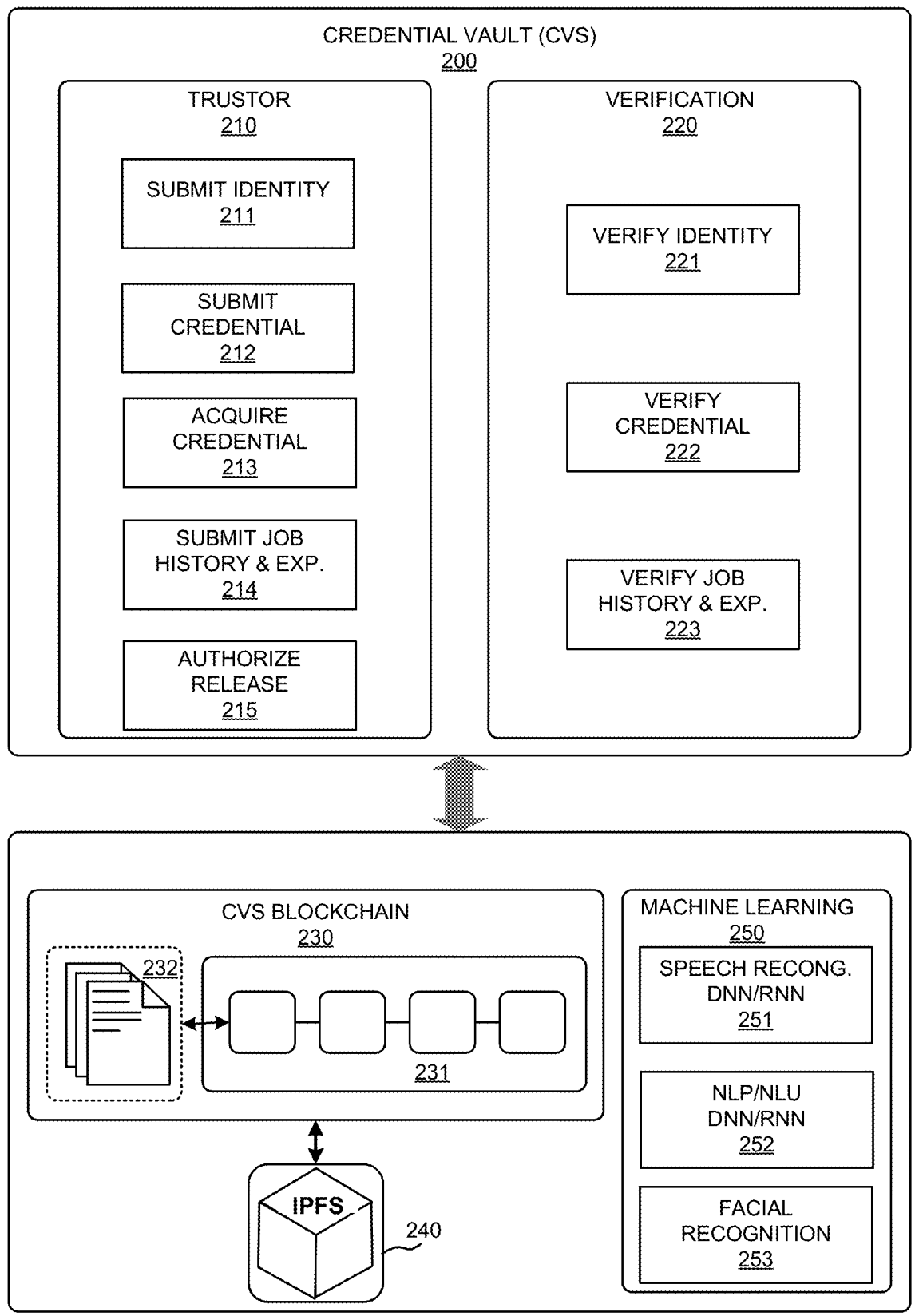
FIG. 2 illustrates an exemplary block diagram of a high-level architecture of the credential vault system in accordance with embodiments of the current invention.

FIG. 2 illustrates an exemplary block diagram of a high-level architecture of the credential vault system in accordance with embodiments of the current invention. Credential Vault System has two major components, namely, a Trustor Module 210 and a Verification Module 220. Trustor Module 210 includes entities for identity submission 211, credential submission 212, credential acquisition 213, job history and experience submission 214, and authorization for release 215. In one embodiment, Trustor Module 210 receives inputs from one or more trustors through a user interface or a network connection. Trustor module 210 processes the trustor inputs and passes them to other components of the CVS. In one embodiment, entity 211 of Trustor Module 210 enables a trustor to submit the identity to CVS for verification. Entity 212 of Trustor Module 210 enables the trustor to submit credentials in possession, such as a photocopy of a diploma. Entity 214 of Trustor Module 210 enables the trustor to submit job history and experience (JHE). In one embodiment, entity 214 processes the JHE submitted by the trustor, in plain language or in a resume, using an RNN process performing a natural language process/natural language understanding (NLP/NLU). Entity 214 generates a set of canonical credentials based on the submission from the trustor. In another embodiment, entity 214 provides a formatted form to the trustor to provide the JHE in canonical credential format. In one embodiment, entity 213 of Trustor Module 210 provides a credential reference to the trustor to acquire credentials, such as pay and download a digital copy from the issuer. Entity 213 uses data mining to obtain the credential reference for verification based on the submission provided by the trustor.

In one embodiment, each trustor record has a hierarchical setting of authorization for release. The authorization includes a whole record release, individual credential release, searchable level setting, and black/white list. Entity 215 Trustor can further authorize releasing his identity, credentials and job history and experience to one or more beneficiaries. In one embodiment, the levels of authorization are different for different beneficiaries. In another embodiment, the trustor authorizes auto-match based for one or more prospective job openings.

Verification Module 220 has three sub-modules/entities: a Verify Identity entity 221, a Verify Credentials entity 222, and a Verify Job History & Experience entity 223. Verification module 220 performs verification for each canonical credential of a trustor record. The verification module 220 interacts with the CVS database to append verified credentials to the corresponding trustor record.

A CVS blockchain 230 with an Interplanetary file system (IPFS) 240 is the final storage of the trustor's information. Three Underlying AI machine learning algorithms 250 are used to support specific operations. Module 251 is an automatic speech recognition (ASR) that is based on a recurrent network (RNN) deep learning model The RNN is trained and used to convert speech to text. Module 252 is yet another RNN deep learning model that is trained and used to perform NLP/NLU to understand the text. Finally, a Facial Recognition 253 based on deep neural network (DNN)/convolutional neural network (CNN) is trained and used for face recognition. These tools are used to automate the verification processes.

Figure 3:
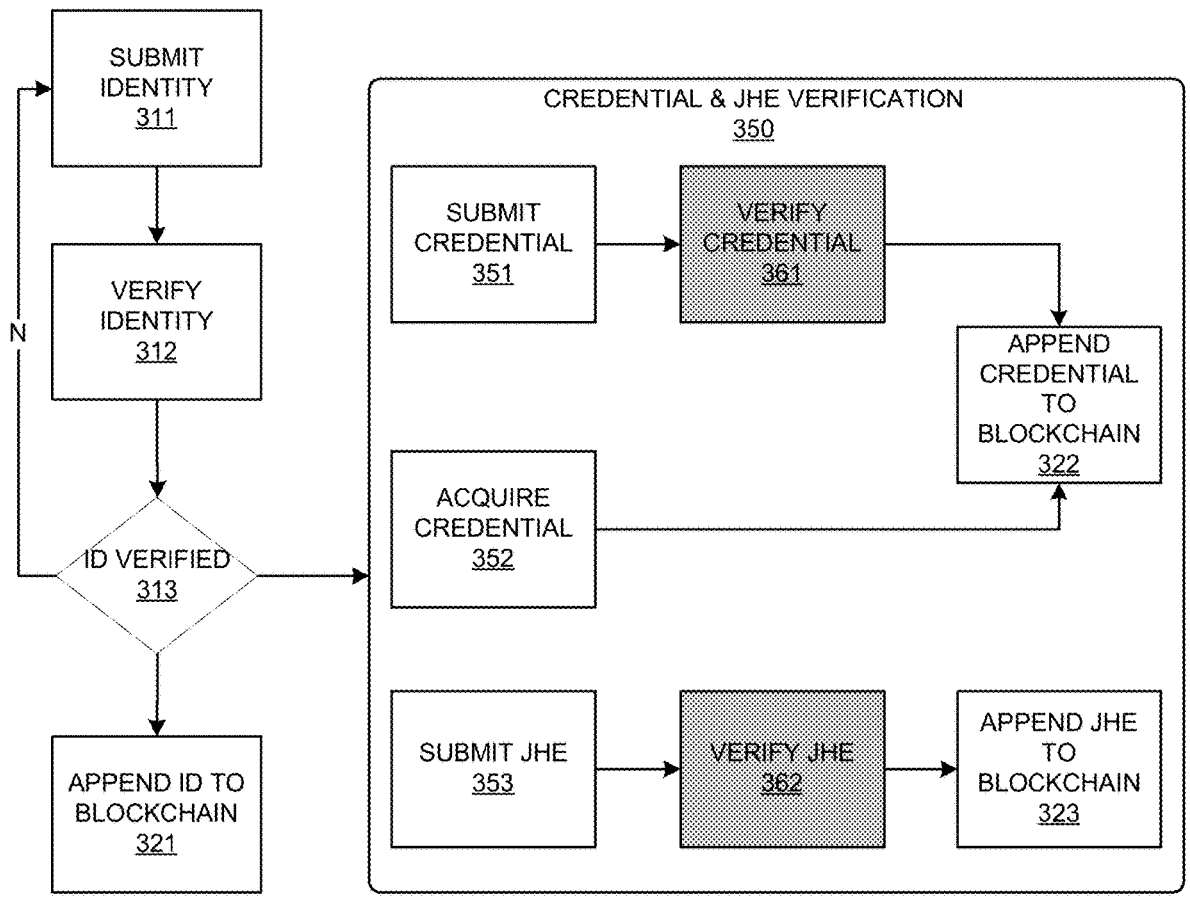
FIG. 3 illustrates an exemplary flow diagram for the submission and verification procedure in accordance with embodiments of the current invention.

FIG. 3 illustrates an exemplary flow diagram for the submission and verification procedure in accordance with embodiments of the current invention. Submit Identity process 311 allows trustor to submit the trustor identity and personal information. True identity is the backbone of CVS. Verify Identity process 312 verifies the submitted identity of the trustor. Once the trustor identity is verified, it will be stored in the blockchain. Only after the true identity of the trustor is verified could other credentials be submitted and job history and experience for verification in credential & JHE verification 350. Submit Credential 351 receives credentials in possession submitted by the trustor. For example, a college diploma, a certificate from a professional society, and so on. Since the credentials are uploaded by the trustor, CVS will undertake a thorough process to verify the credentials at process 361. Acquire Credential process 352 facilitates trustor to acquire a credential. In one embodiment, a credential reference is provided to the trustor by Acquire Credential process 352. The credential reference, for example, provides pay and download links to the trustor to request the certificate for a credential. In one embodiment, the credential reference is obtained by Acquire Credential process 352 based on the canonical credential to be verified. CVS will integrate to the most popular issuers to smooth out the integration. For example, if the issuer offers API (Web Services), Acquire Credential process 352 enables trustor to log on to the issuer services and download the credential. Process 322, subsequently, appends the acquired credentials and verified credentials to the blockchain data storage.

Process 353 receives JHE from the trustor. In one embodiment, process 353 generates a set of canonical credentials based on the JHE received. For each JHE, or each canonical credential generated from the JHE, process 362 performs the verification. Process 323 appends the verification results, either positive or negative, to the blockchain in a transaction/request record. Once a JHE is recorded in the blockchain, it cannot be altered. Any update to the JHE becomes a new transaction and is appended in the blockchain.

Figure 4:
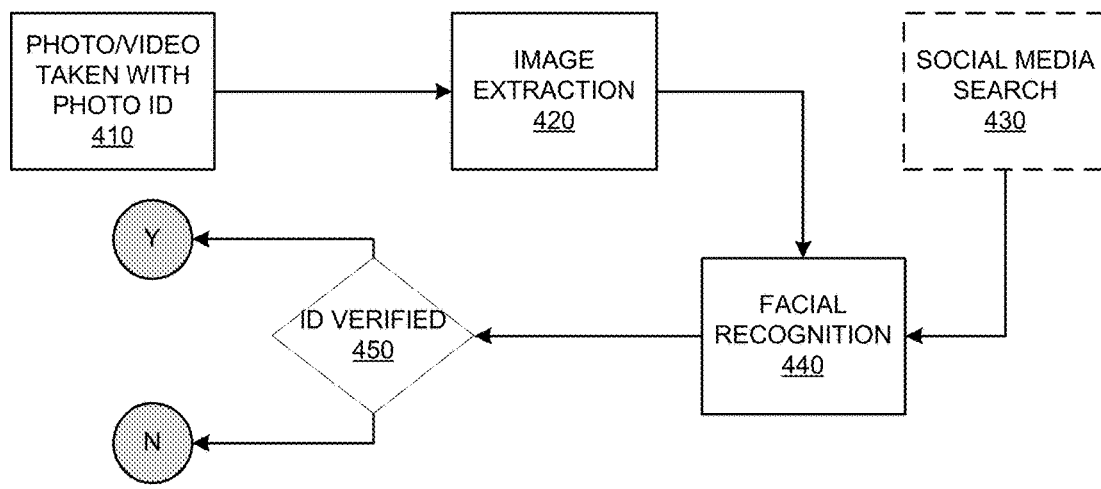
FIG. 4 illustrates an exemplary flow diagram for the trustor ID verification procedure in accordance with embodiments of the current invention.

FIG. 4 illustrates an exemplary flow diagram for the trustor ID verification procedure in accordance with embodiments of the current invention. To ensure the identity of a trustor, CVS uses multi-faceted verification methods. At process 410, Trustor's identity, such as the government-issued ID card, personal information, along with a self-introduction video, is submitted to CVS. A selfie of the trustor along with his official photo ID card (410) using a device registered in the CVS, which is associated with the trustor's account. In one embodiment, photos and videos from social media of trustor are collected at process 430. In process 420, an image extraction algorithm such as image segmentation is used to extract trustor's face in the selfie, the self-introduction video, and the photo on the government-issued ID card, in addition to trustor's face in social media collected on him. These images will be passed on to 440, which uses the Facial Recognition deep learning model. The facial recognition model will authenticate the trustor and the submission by the trustor. In one embodiment, the self-introduction video and audio are processed and stored in CVS as a part of trustor account, such as log-in credentials through facial recognition and/or voice recognition.

Figure 5:
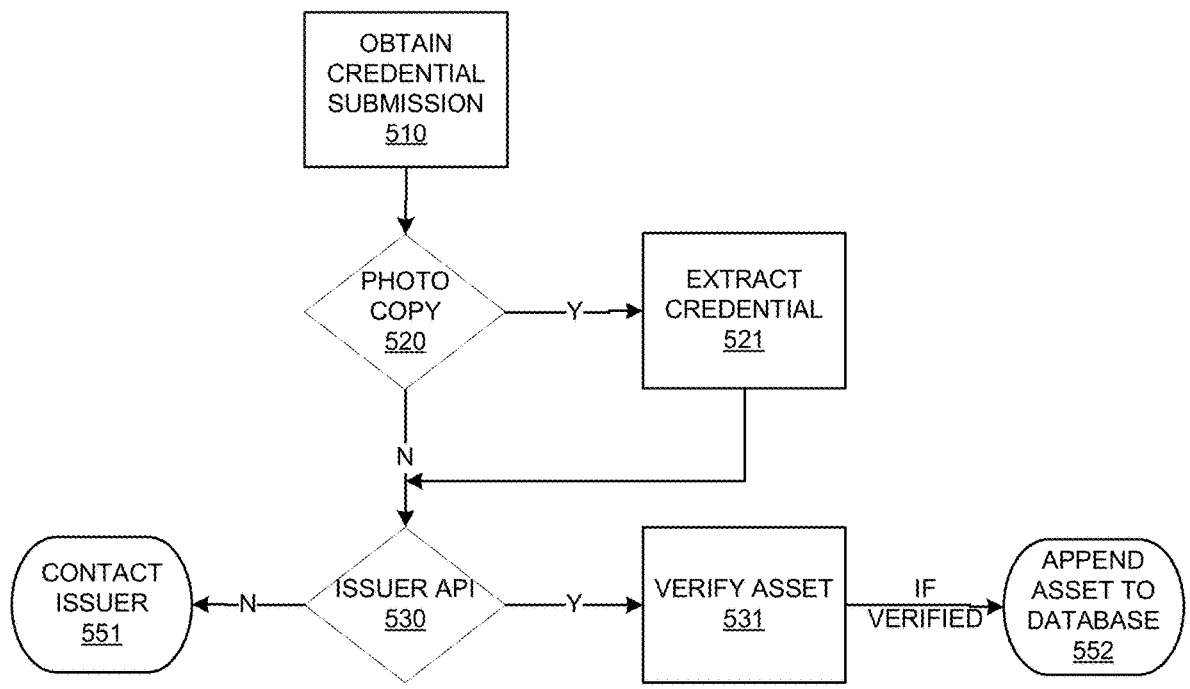
FIG. 5 illustrates an exemplary flow diagram for credential verification using the CVS in accordance with embodiments of the current invention.

FIG. 5 illustrates an exemplary flow diagram for credential verification using the CVS in accordance with embodiments of the current invention. Process 510 locates the issuer of the credential. At step 520, CVS determines if a photocopy or other forms of corroboration of the credential is included in the trustor's submission. If a photocopy of the credential is identified in the trustor's submission, process 521 extracts the credential details from the photo. Many issuers provide online verification process. If step 520 determines no, it means the credential is in some free text format, i.e. canonical form. Then, at step 530, the CVS determines if the issuer provides online services for verification. CVS interfaces with their services through their API when their services are available. If step 530 determines yes, process 531 uses the obtained API to verify the credential. The verification results are sent to Process 552 to record them in the blockchain. The result of the verification, either verified or denied, is appended to the request record of the database. If the credential is verified, the credential, together with the verification, are appended to the asset record of the database. If the issuer does not offer any verification API. Contact Issuers process 551, a robotic credential verification process, further carries out the verification process.

Figure 6:
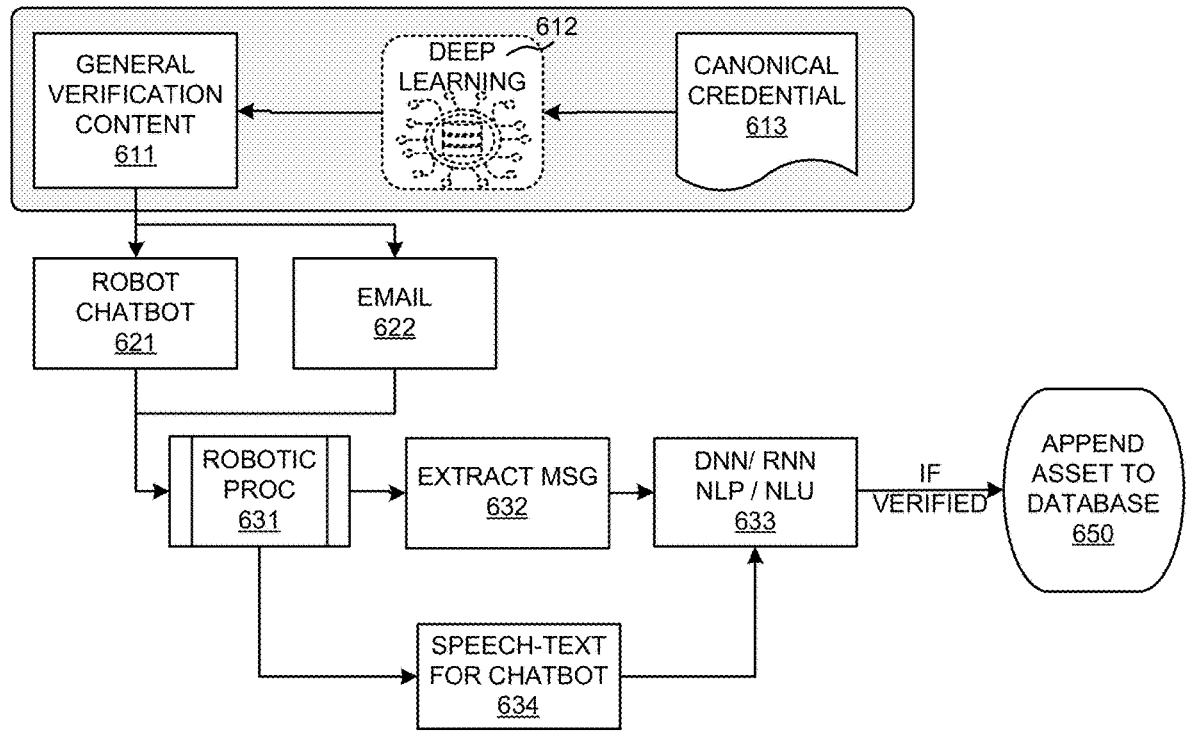
FIG. 6 illustrates exemplary diagrams for robotic credential verification with issuers using the CVS in accordance with embodiments of the current invention.

FIG. 6 illustrates exemplary diagrams for robotic credential verification with issuers using the CVS in accordance with embodiments of the current invention. When it is necessary to contact issuer for verification, CVS provides robotic verifications for identified canonical credentials that are official-record-based. One or more official-record-based credentials are identified at process 613. Process 611 takes the credential details and creates a verification script and email. In one embodiment, the verification script is generated using a deep learning model 612. CVS determines one or more verification methods for the robotic credential verification, including a robot chatbot 621 and/or an email 622. Robotic procedure 631 enables the robotic verification procedure based on the generated script. Email responses and/or chatbot audio responses will be extracted by process 632 and analyzed by process 633. If the responses are phone messages or chatbot dialogs, the audio is converted to text by the speech-to-text RNN model at step 634. The converted text is then analyzed by 633, where the RNN that performs NLP/NLU on the text. Results from both email and/or audio are consolidated. The verification result, either verified or denied are appended to the request record of the CVS. The one or more verified credentials are appended to the asset record of the CVS database at step 650.

In other embodiments, JHE credentials are verified using the robotic verifications similar to the official-record-based credentials. Once the issuer, employer or any verifying party of a JHE credential is identified, a chatbot script and/or email script is generated. The responses are analyzed using the DNN/RNN NLP/NLU model. In one embodiment, the JHE is verified based on social media information and peer affirmations.

Figure 7:
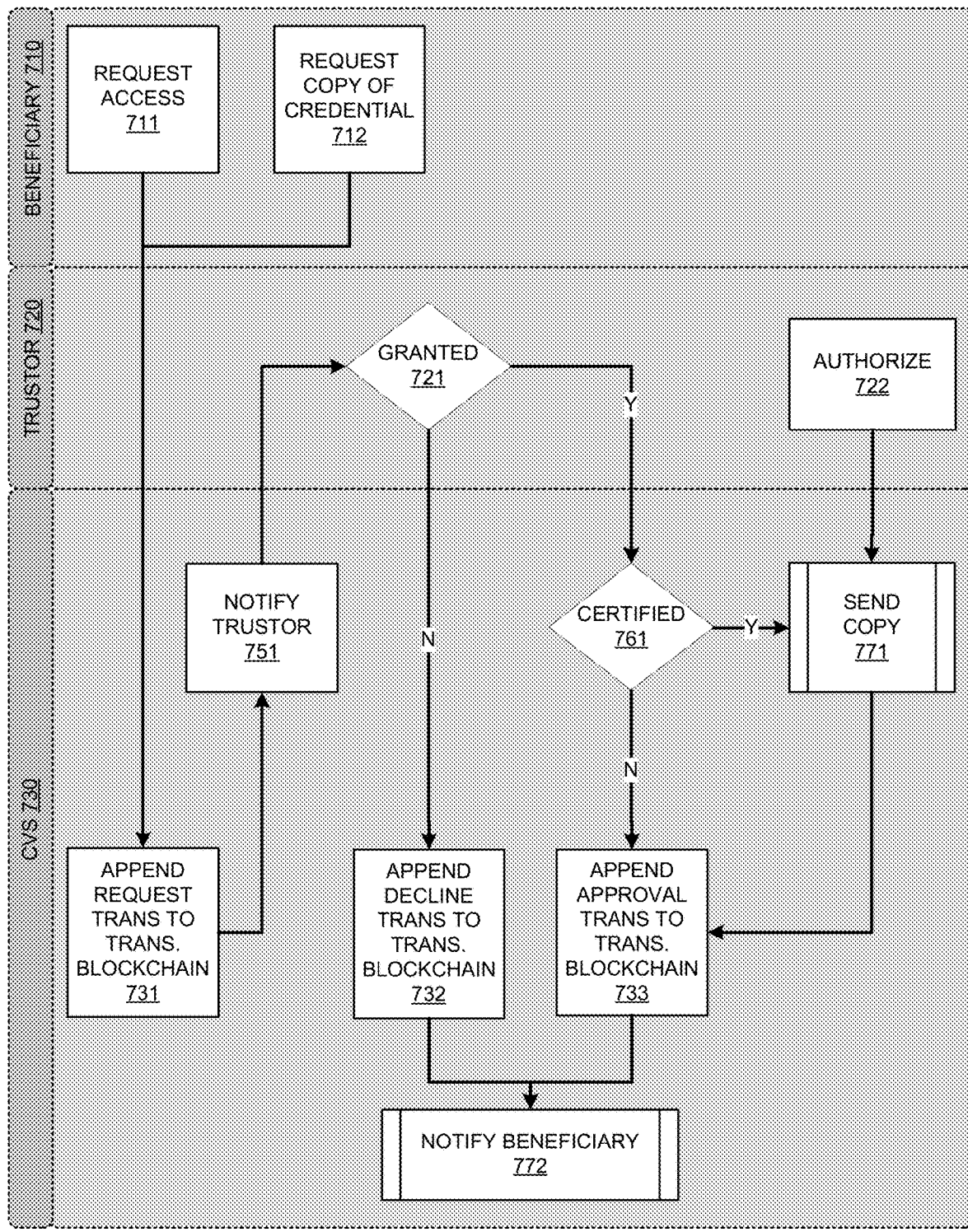
FIG. 7 illustrates exemplary diagrams for trustor record and/or credential release authorization process using the CVS in accordance with embodiments of the current invention.

FIG. 7 illustrates exemplary diagrams for trustor record and/or credential release authorization process using the CVS in accordance with embodiments of the current invention. Trustor can authorize the release of his credentials and JHE to a beneficiary. CVS offers two services: (1) authorize beneficiary to access trustor's profile if the beneficiary is given the privilege, and (2) send beneficiary "notarized" or certified copy of credentials. Sending a copy of the credential can be initiated by both the beneficiary and the trustor. If it is initiated by the beneficiary, it needs to have the trustor's approval. On the other hand, trustor can directly authorize sending copy of credential to beneficiary. For example, a trustor authorizes CVS to send his college diploma and transcript to multiple graduate schools for admissions.

A beneficiary 710 can request access to one or more trustor records by sending an access request in process 711. Beneficiary 710 can also request a copy of the credential of the trustor in process 712. Upon receiving the one or more requests from beneficiary 710, the CVS identifies the requested one or more trustors and stores corresponding request transaction in the request record of each corresponding trustor in the CVS blockchain database. Upon determining the request from the beneficiary is authorized, the CVS sends the certified copy of the credential to the beneficiary in process 771.

Upon receiving request from the beneficiary, CVS 730 first appends the request transaction to the blockchain at process 731. At process 751, CVS 730 notifies trustor 720 on the request. In one embodiment, the notification process 751 checks the trustor record with access/privacy settings. In another embodiment, the CVS processes the request from the beneficiary and detects authorization information. In yet another embodiment, a notification or a response is received from the trustor 720 regarding the request from the beneficiary. CVS 730 analyzes one or more pieces of access information for the request and determines if the request is granted or denied as in process 721. If CVS 720 determines that the beneficiary's request is denied, CVS 720 appends the request decline transaction to blockchain at step 732 and sends notifications the beneficiary at step 772. If trustor 720 determines the beneficiary's request is granted, and if the request is to access trustor's credential in CVS, the approval request will be appended to the blockchain at step 733, and CVS 720 sends notifications to the beneficiary at step 772. If the approved request is for a certified copy of credential, CVS 720 sends the certified copy to beneficiary and appends a send transaction to blockchain at step 771.

Figure 8A:
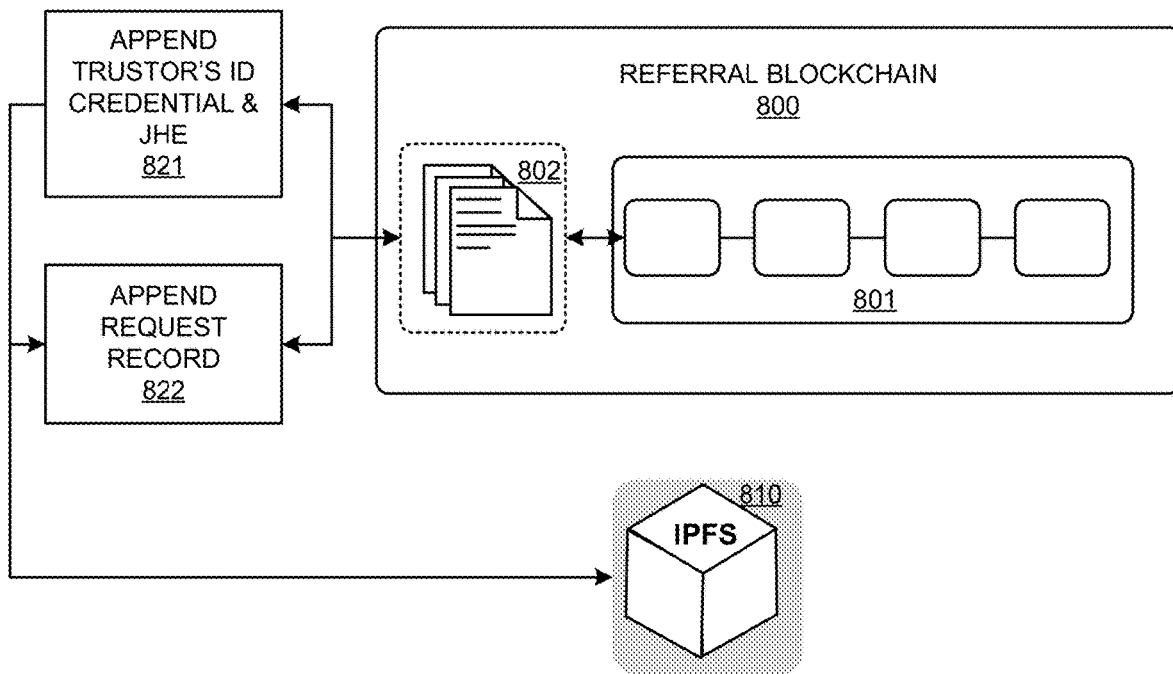
FIG. 8A illustrates an exemplary block diagram of the credential vault blockchain database with IPFS in accordance with embodiments of the current invention.

FIG. 8A illustrates an exemplary block diagram of the credential vault blockchain database with IPFS in accordance with embodiments of the current invention. CVS comprises two major storage technologies, the blockchain distributed ledger 800 and a private Interplanetary file system (IPFS) 810. IPFS is a protocol and peer-to-peer network for storing and sharing data in a distributed file system. IPFS uses content-addressing to identify each file uniquely. It offers decentralization and tamper-proof storage with cryptography. In CVS, the ledger 801 is to maintain the trustor's identity, his assets and requests from both trustor and beneficiary. Smart contract 802 is built upon the distributed ledger 801. Since distributed ledger allows for multiparty and shared use, distributed ledgers can be equipped with multiparty business logic, which is more commonly referred to as 'smart contract'. The request 822 from beneficiary to access a trustor and the corresponding assets are maintained in the request record. Trustor's identity data, including corresponding personal information, ID card photocopy, selfie, and introduction video is managed by asset record procedure 821.

Module 821 comprises Append Identity, Append Credential, and Append JHE. When trustor's identity is verified, the module will store the identity file such as the photocopy of his official ID card to IPFS 810. IPFS 810 returns a hash address of his office ID card. The hash address is the Trustor ID that is stored in the ledger of the blockchain. Other supportive documents such as selfie, introduction video and so on are also stored in IPFS 810. In return, their hash addresses are stored in the blockchain 800 as asset IDs. For each verified credential, credential information, such as the photocopies of the diploma, the certificate, are stored to IPFS 810. Corresponding hash addresses are the asset IDs. Similarly, for job history and experience, credential information for JHE are stored in IPFS 810. The hash addresses of each JHE credential is the asset ID. Module 822 records beneficiary request records in the CVS database. Module 822 performs appending request transaction, appending request decline, appending request approval, and appending send credential.

Figure 8B:
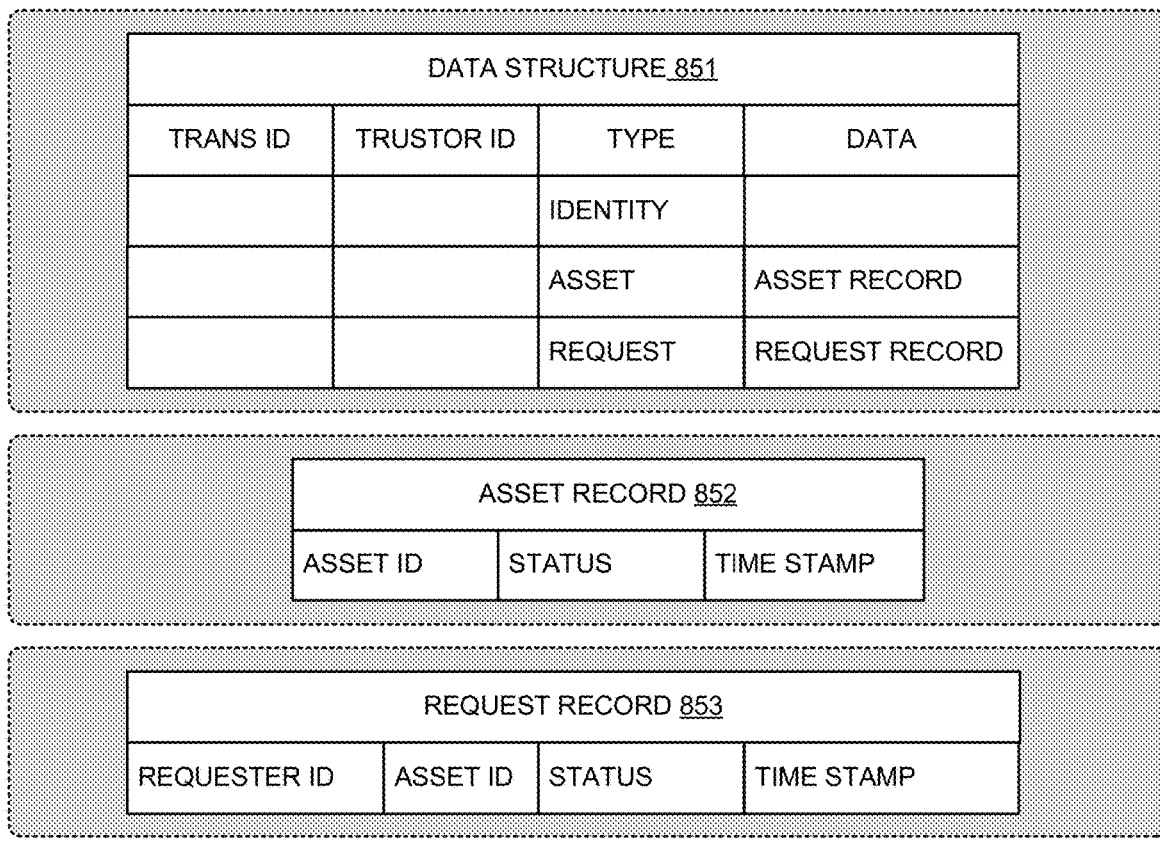
FIG. 8B illustrates exemplary block diagrams of data structures of asset record and request record in the CVS database in accordance with embodiments of the current invention.

FIG. 8B illustrates exemplary block diagrams of data structures of asset record and request record in the CVS database in accordance with embodiments of the current invention. The blockchain ledger is the linked list of transactions that support CVS. Trustor's data structures 851 support different types of entries. Beneficiary's identity and profile can be included as needed. Depending on the type of transactions, such as identity, asset (e.g. credentials and JHEs), and request, the structures will contain the relevant data. An exemplary asset record 852 includes the asset ID, the status and the time stamp. The asset ID is the hash address of the asset data stored in the IPFS. An exemplary request record 853 includes the request ID, the asset ID, the status and the time stamp. Requester ID is the beneficiary ID.

Figure 9:
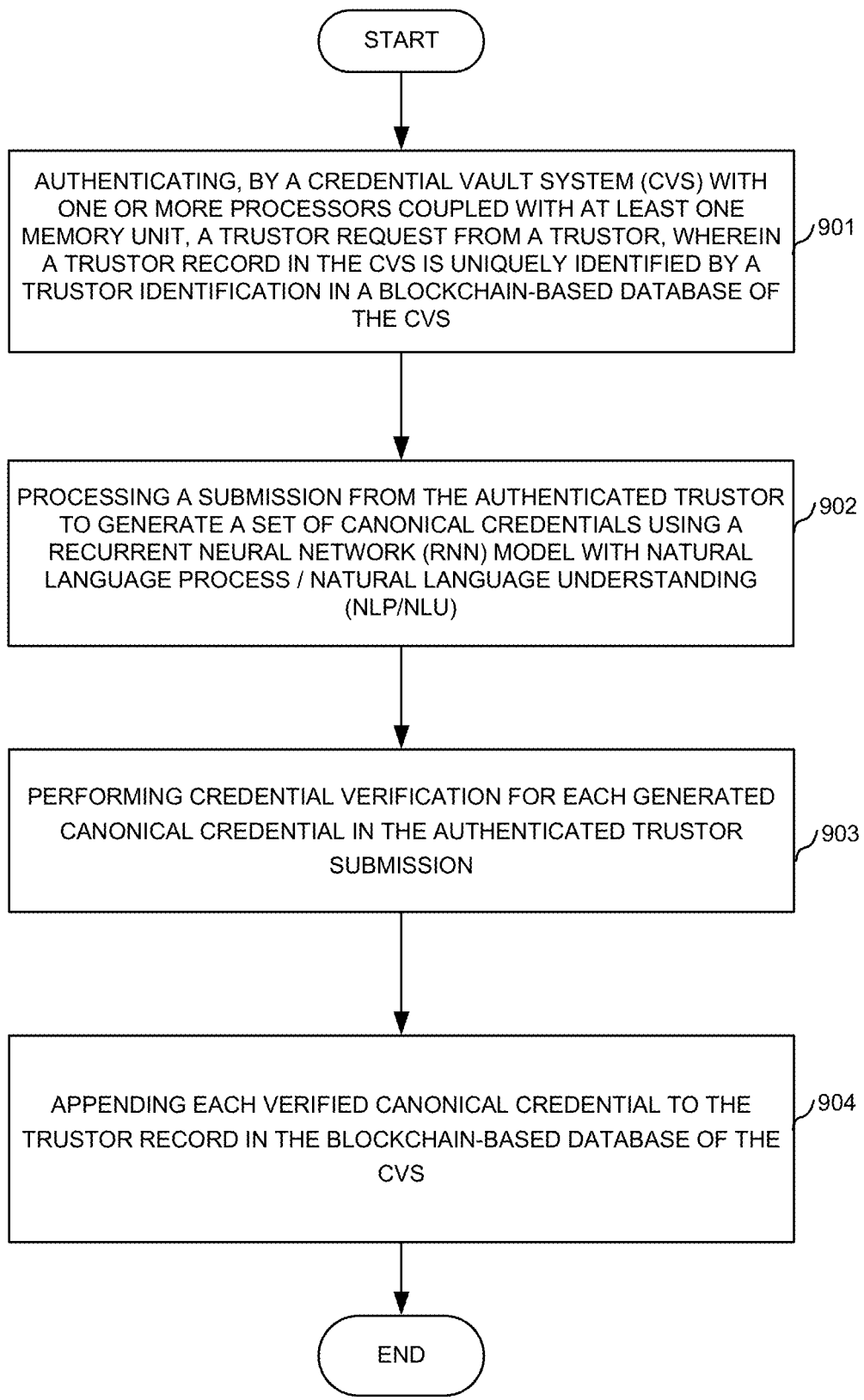
FIG. 9 illustrates an exemplary flow chart for the credential verification procedure using the credential vault system in accordance with embodiments of the current invention.

FIG. 9 illustrates an exemplary flow chart for the credential verification procedure using the credential vault system in accordance with embodiments of the current invention. At step 901, the CVS authenticates a trustor request from a trustor, wherein a trustor record in the CVS is uniquely identified by a trustor identification in a blockchain-based database of the CVS. At step 902, the CVS processes a submission from the authenticated trustor to generate a set of canonical credentials using a recurrent neural network (RNN) model with natural language process/natural language understanding (NLP/NLU). At step 903, the CVS performs credential verification for each generated canonical credential in the authenticated trustor submission. At step 904, the CVS appending each verified canonical credential to the trustor record in the blockchain-based database of the CVS.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
   authenticating, by a credential vault system (CVS) with one or more processors coupled with at least one memory, a trustor request from a trustor with a submission from a CVS registered device, wherein a trustor record in the CVS is uniquely identified by a trustor identification (ID) in a blockchain-based database of the CVS, wherein the trustor ID is at least one selecting from an official government-issued ID card, and a self-introduction video clip;
   processing a credential description submission from the authenticated trustor request to generate one or more canonical credentials using a recurrent neural network (RNN) model with natural language process natural language understanding (NLP NLU);
   performing one or more automated credential verification for each of the one or more generated canonical credentials in the authenticated trustor submission; and
   appending a canonical credential to the trustor record in the blockchain-based database of the CVS when the canonical credential is verified to provide a transparent, immutable and secured repository for verified credentials.

2. The method of claim 1, wherein the authenticating is performed by image processing a selfie of the trustor alongside an official photo ID.

3. The method of claim 1, wherein the canonical credential is an official-record-based credential that is verifiable by a certified official record.

4. The method of claim 3, wherein the verification is performed based on an official record corresponding to the canonical credential in the submission.

5. The method of claim 3, wherein there is no corresponding official record for the canonical credential in the submission, and wherein an authorization reference is generated for the canonical credential.

6. The method of claim 5, wherein the authorization reference is an instruction returned to the trustor that includes direct links for obtaining corresponding official record for the canonical credential.

7. The method of claim 5, wherein the authorization reference triggers a robotic verification of the CVS.

8. The method of claim 7, wherein the robotic verification by the CVS uses at least one inquiry process comprising an automated email correspondence and a chatbot voice inquiry.

9. The method of claim 8, wherein the robotic verification further comprising an RNN process performing a natural language process/natural language understanding (NLP/NLU) on one or more responses to the inquiry process.

10. The method of claim 1, wherein the blockchain-based database comprises a credential vault blockchain and a private interplanetary file system (IPFS).

11. The method of claim 10, wherein an asset related to a canonical credential is stored in the private IPFS and an asset ID of the asset is appended to the credential vault blockchain.

12. A system comprising:
   one or more networking interfaces that connects the system with a social media network;
   a memory; and
   a processor coupled to the memory, the processor configured to:
      authenticate a trustor request from a trustor with a submission from a CVS registered device, wherein a trustor record in the CVS is uniquely identified by a trustor identification (ID) in a blockchain-based database of the system, wherein the trustor ID is at least one selecting from an official government-issued ID card, and a self-introduction video clip;
      process a credential description submission from the authenticated trustor request to generate one or more canonical credentials using a recurrent neural network (RNN) model natural language process natural language understanding (NLP NLU);
      perform one or more automated credential verification for each of the one or more generated canonical credentials in the authenticated trustor submission; and
      append a canonical credential to the trustor record in the blockchain-based database of the CVS when the canonical credential is verified to provide a transparent, immutable and secured repository for verified credentials.

13. The system of claim 12, wherein the canonical credential is an official-record-based credential that is verifiable by a certified official record.

14. The system of claim 13, wherein the verification is performed based on an official record corresponding to the canonical credential in the submission.

15. The system of claim 13, wherein there is no corresponding official record for the canonical credential in the submission, and wherein an authorization reference is generated for the canonical credential.

16. The system of claim 15, wherein the authorization reference is an instruction returned to the trustor that includes direct links for obtaining corresponding official record for the canonical credential.

17. The system of claim 15, wherein the authorization reference triggers a robotic verification of the CVS.

18. The system of claim 17, wherein robotic verification further comprising an RNN process performing a natural language process/natural language understanding (NLP/NLU) on one or more responses to the inquiry process.

19. The system of claim 12, wherein the blockchain-based database comprises a credential vault blockchain and a private interplanetary file system (IPFS).

* * * * *